United States Patent [19]

Yamada et al.

[11] Patent Number: 4,636,870
[45] Date of Patent: Jan. 13, 1987

[54] METHOD AND SYSTEM FOR RECORDING TRANSFORMED IMAGES

[75] Inventors: Susumu Yamada, Osaka; Mitsuhiko Yamada, Kyoto, both of Japan

[73] Assignee: Dainippon Screen Mfg. Co., Ltd., Kyoto, Japan

[21] Appl. No.: 558,871

[22] Filed: Dec. 6, 1983

[30] Foreign Application Priority Data

Mar. 8, 1983 [JP] Japan ................................ 58-038821

[51] Int. Cl.⁴ ........................ H04N 1/17; H04N 1/40; H04N 1/06; H04N 1/10
[52] U.S. Cl. .................................... 358/288; 358/280; 358/286; 358/289; 358/293
[58] Field of Search ................ 358/280, 285, 286, 287, 358/288, 289, 293, 294; 364/518, 522, 523; 355/52

[56] References Cited

U.S. PATENT DOCUMENTS 3,845,285 10/1974 Leroy .................................... 364/518
4,327,380 4/1982 Yamada et al. ...................... 358/288
4,470,074 9/1984 Yamada .............................. 358/287

Primary Examiner—James J. Groody
Assistant Examiner—John K. Peng
Attorney, Agent, or Firm—Lowe Price LeBlanc Becker & Shur

[57] ABSTRACT

A method and system for transforming images in reproducing images, in which image data obtained from original pictures are written into or read from a memory according to a specified transformation condition which is preliminarily given to a computer module to designate a scanning start point or start and stop points of each scanning line.

27 Claims, 9 Drawing Figures

FIG. 7
(a) 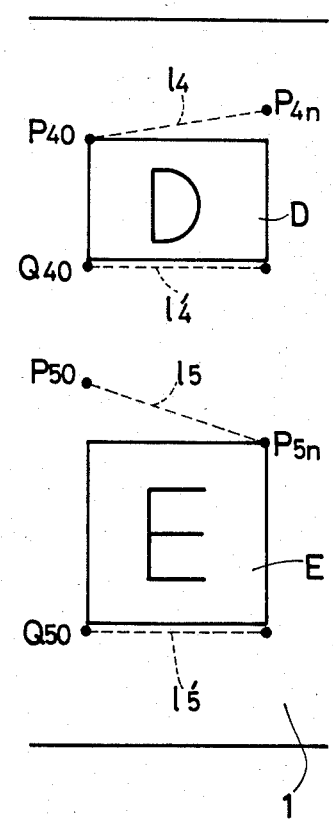
(b) 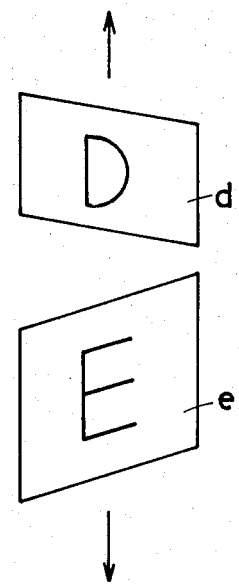

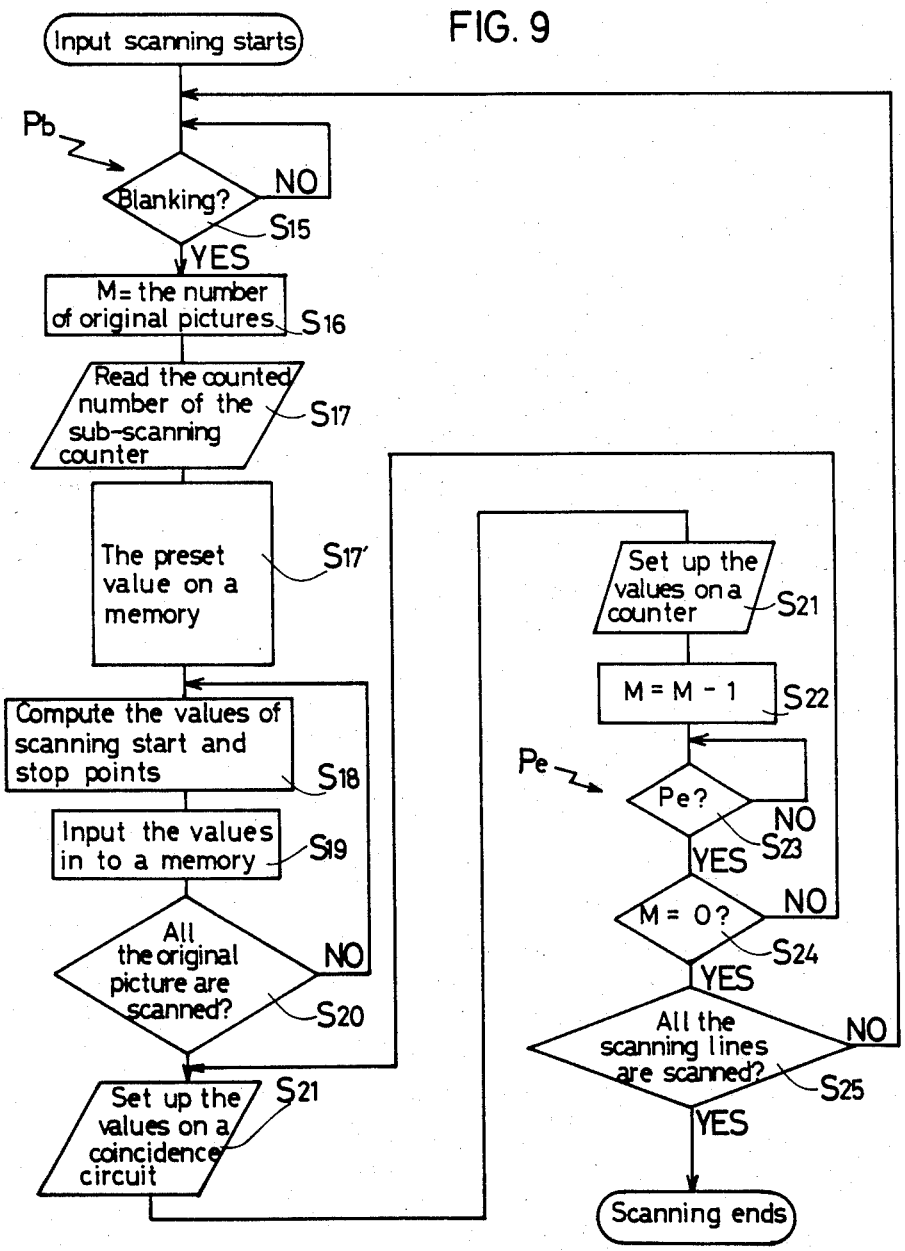

METHOD AND SYSTEM FOR RECORDING TRANSFORMED IMAGES

FIELD OF THE INVENTION

This invention relates to a method and system for recording transformed images by using an image reproducing system such as a facsimile or a scanner, particularly to such a method and system in which specified data of transformation are input to a control means such as a micro-computer beforehand, whereby image data obtained from an original picture are transformed according to said specified transformation data when they are written into or read from a memory.

BACKGROUND OF THE INVENTION

Necessity of performing transformation work on an image is notable in a situation such that advertising effect of a poster, etc. must be heightened or that impression of an image must be exalted.

In response to such requirements, conventionally a method as disclosed in Japanese Patent Publication No. 56-30892 is used. The method comprises steps of marking a scanning start line of an optional curve on the top edge of an original picture as well as a scanning stop line on the bottom edge of the original picture, and scanning the original picture from the start line to the end line according to the curve of the start line to obtain a transformed image of the original picture. However this procedure for marking both lines is troublesome and moreover the following malfunction might occur when the lines having specific colors are drawn on an original picture including the specific colors. That is, a scan might halt on a midway place of the original picture where the same specific color as the stop line exists. In addition, this kind of marking work might bring rugged transformation of the original picture of its pixel level.

SUMMARY OF THE INVENTION

A prime object of this invention is to provide a method of image transformation being free from necessity of marking a scanning start line and a scanning stop line. And another object is to provide such a method in which a highly detailed transformation image without containing a rugged contour can be obtained.

To achieve the above method, at first scanning start points for every scanning line for an original picture are determined by a control means such as a micro-computer according to a specified transformation condition being set up on the control means. After that, image data obtained by scanning the original picture are written into or read from a memory according to thus computed data of the scanning start points for all the scanning lines.

The above and other objects and features of this invention can be appreciated more fully from the following detailed description when read with reference to the accompanying drawings.

BRIEF DESCRIPTION OF THE DRAWINGS

FIG. 7 shows a method of this invention in which plural original pictures are scanned collectively.

FIG. 9 shows a flow chart for the circuit shown in FIG. 8.

PREFERRED EMBODIMENT OF THE INVENTION

In the following description, coordinate values on an original picture can be determined by an output value X of a main scanning pulse encoder and an output value Y of a sub-scanning pulse encoder of either the input side or the output side (mentioned later).

Figure 1:
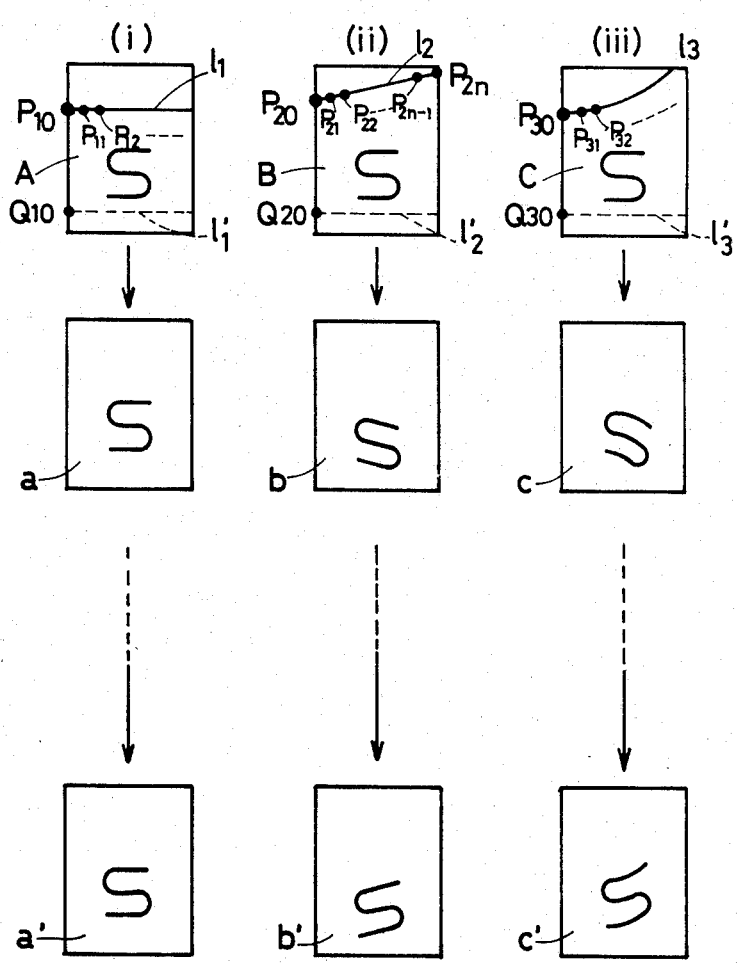
FIG. 1 shows a principle of this invention.

FIG. 1 shows several modes of image transformation of this Invention.

Mode (i) of FIG. 1 shows a case wherein scanning start points $P_{10}$, $P_{11}$, $P_{12}$ ... are set up on a start line $l_1$ which is parallel to the sub-scanning direction (Y = constant). Meanwhile, when the coordinate value of the first start point $P_{10}(X_{10}, Y_{10})$ is input to a computer module, it computes the coordinate values of the succeeding points $P_{11}$, $P_{12}$ ... according to a setup condition, in this case each Y value of the succeeding points is equal to the value $Y_{10}$ of the point $P_{10}$, while the X value varies. By scanning an original picture A in the main scanning direction according to said start line $l_1$, image data of an image "a" without transformation is stored into a memory as a result.

Mode (ii) of FIG. 1 shows a case wherein scanning start points $P_{21}$, $P_{22}$, $P_{2(n-1)}$ ... are set up on a start line $l_2$ which is a connection line between the first start point $P_{20}(X_{20}, Y_{20})$ and the end point $P_{2n}(X_{2n}, Y_{2n})$, in short, a slant line. In this, the coordinate values of the points $P_{21}$, $P_{22}$, $P_{2(n-1)}$ ... are computed by said computer module. Then by scanning an original picture B in the main scanning direction according to said start line $l_2$, image data of a transformed image "b" is stored into the memory.

Mode (iii) of FIG. 1 shows a case wherein scanning start points $P_{31}$, $P_{32}$ ... are set up on a start line $l_3$ which has a figure of $Y = f(x)$, for example $y = x^2$ (y direction is equal to $-Y$ direction, x direction is equal to X direction), of which origin is a point $P_{30}(X_{30}, Y_{30})$. In this, the coordinate values of the points $P_{31}$, $P_{32}$ ... are computed by said computer module conforming to the above function being input beforehand. Then by scanning an original picture C in the main scanning direction according to said start line $l_3$, image data of a transformed image "c" is stored into the memory.

Of course in the Mode (i) (ii), functions $Y = K$, $Y = x$ can be applied instead of the abovementioned ways respectively, but the abovementioned ways are superior to using said functions in pursuit of simplicity.

The same result can be attained by processing image data of an original picture stored in a memory using the computer module when the data are read from the memory. For example in Mode (iii), at first the computer module is informed with the first start point $P_{30}(X_{30}, Y_{30})$ of the start line $l_3$ and a function $y = x^2$ which has the point $P_{30}$ as its origin. Secondly the computer module computes that reading start points $P_{31}$, $P_{32}$ ... on a recording drum according to the set-up condition. Then the image data are read from the memory according to said recording start points $P_{31}$, $P_{32}$ ... to record a transformed image c' of the original picture. In the aforesaid embodiments, as a stop signal of writing or reading of the image data, usually a blanking pulse obtained from a timing pulse generator using the output signal of said main scanning direction encoder is used. The same result can be attained by inputting the data of stop lines $l'_1$, $l'_2$ or $l'_3$ corresponding to respective broken lines shown in FIG. 1 to said computer module. In this case, the intended effect can be obtained merely by inputting the coordinate values of points $Q_{10}$ ($X'_{10}$, $Y'_{10}$), $Q_{20}$ ($X'_{20}$, $Y'_{20}$) or $Q_{30}$ ($X'_{30}$, $Y'_{30}$).

Figure 2:
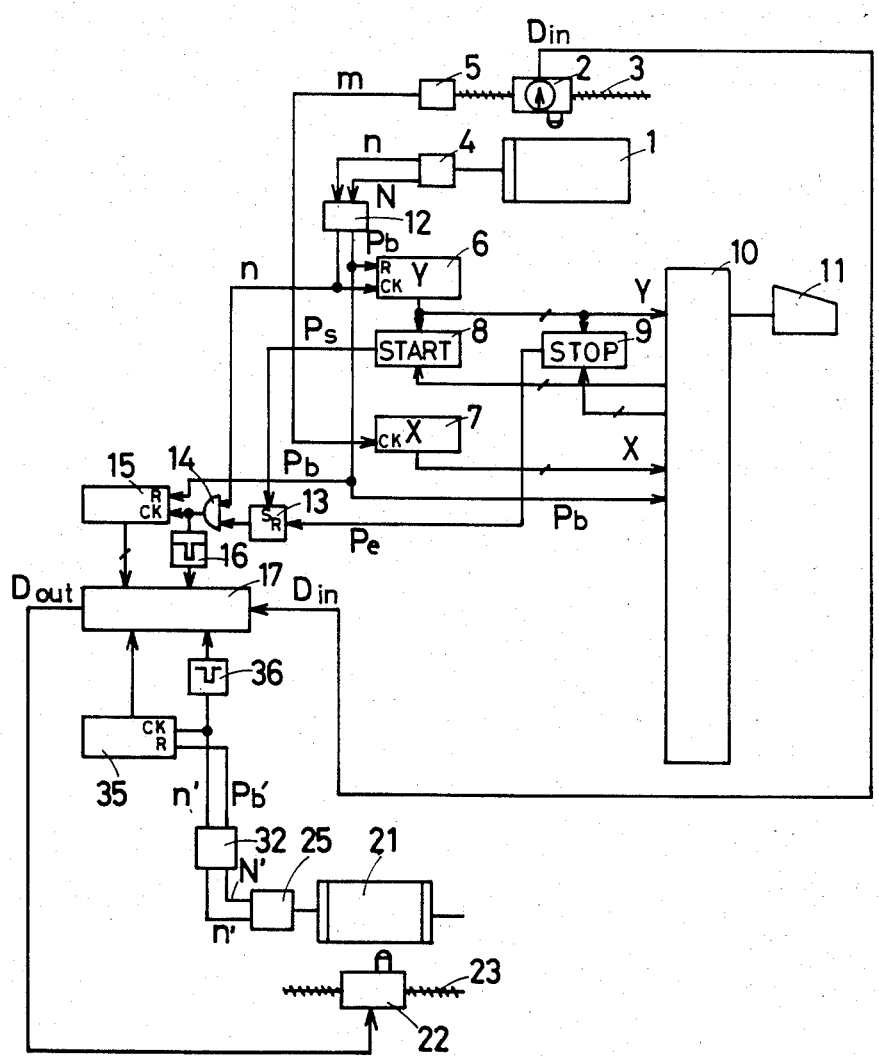
FIG. 2 shows an embodiment of this invention.
Figure 3:
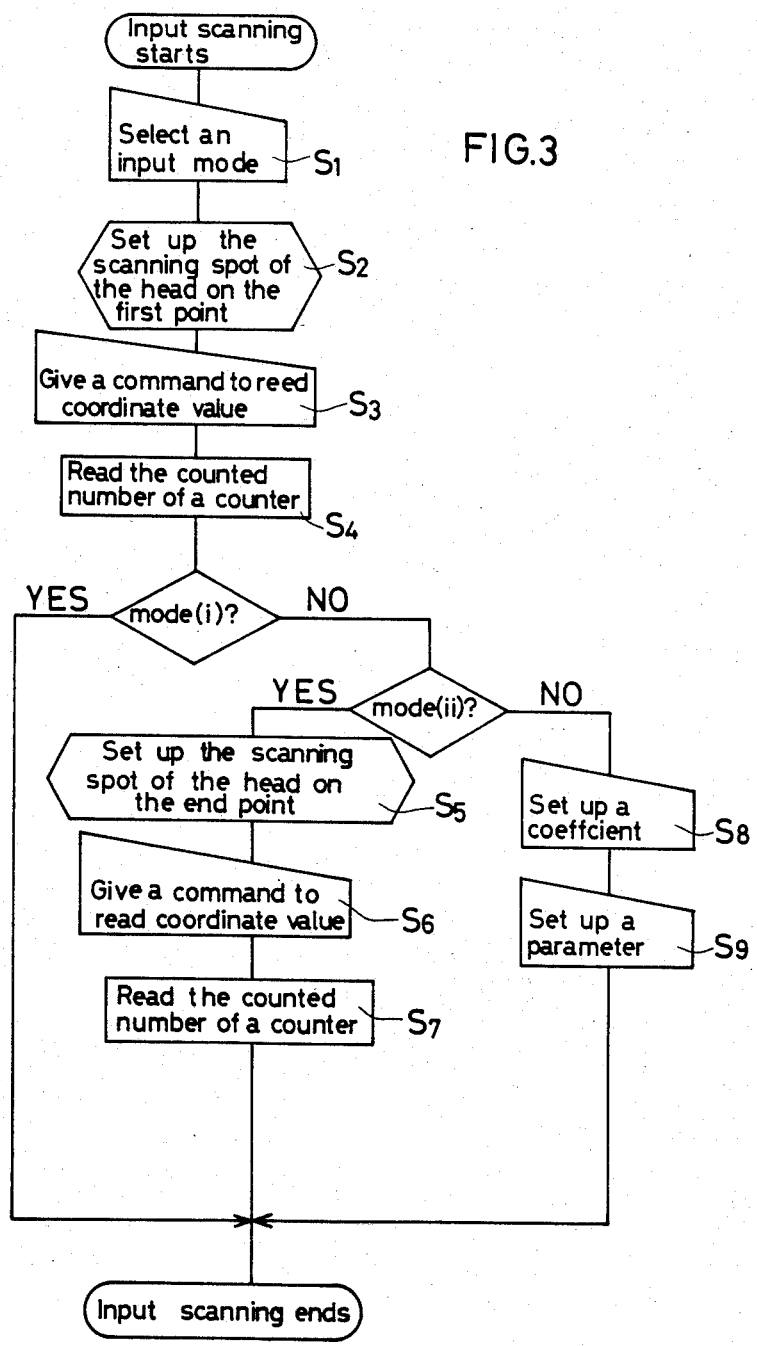
FIG. 3 shows a flow chart for setting up a transformation condition on a micro computer shown in FIG. 2.

FIG. 2 shows a block diagram of an embodiment of this invention. In FIG. 2, at first an image signal is obtained by scanning an original picture placed on an input scanning drum 1 by using a scanning head 2. The image signal is converted from an analog form into a digital form and input to a memory 17 as image data $D_{in}$. Every coordinate value on the input scanning drum 1 is obtained by counting the number of the output signal from a main scanning direction encoder 4 and a subscanning direction encoder 5 in respective counter 6 and 7.

Namely, the main scanning direction encoder 4 outputs a n-time pulse which is obtained by dividing one revoltuion of the scanning drum 1 and an N pulse which is generated every time the n-time pulse is output N times. Said Y value can be obtained by counting the n-time pulse in the main scanning counter 6, and said X value can be obtained by counting pulses output from the subscanning direction encoder 5, which pulses synthesize with revolution of the scanning drum 1.

Said n-time pulse from the main scanning pulse encoder 4 and N pulse are once input to a timing pulse generator 12. Then the n-time pulse is input from the timing pulse generator 12 to the main scaning direction counter 6, while the generator 12 generates a blanking pulse Pb for resetting the main scanninbg direction counter 6 by using the N pulse and the n-time pulse.

Thus obtained coordinate values X and Y are input to a computer module 10 to be used for controlling transformation condition and for determining the writing or reading start point etc.

An input procedure of a transformation condition to a computer module 10 is performed as follows. At first, an input mode as shown as modes (i), (ii) or (iii) in FIG. 1 is set up by using a key board 11 ($S_1$). Secondly the scanning spot of the scanning head 2 is set up on the first start point of a specified start line ($S_2$). Then by inputting an order for reading coordinate values from a keyboard ($S_3$), counted numbers $X_{10}$ and $Y_{10}$ of the main and the sub scanning direction counters 7 and 6 are read respectively ($S_4$). This procedure is the entire procedure for Mode (i), however for Mode (ii) the same procedure is necessary for setting up the end point of the start line $P_{2n}$ ($X_{2n}$, $Y_{2n}$)($S_5$) ($s_6$) to read counted numbers of both counters ($S_7$). While if the case is Mode (iii), a desired function and parameters are input to the computer module 10 by using the keyboard ($S_8$) ($S_9$).

Figure 4:
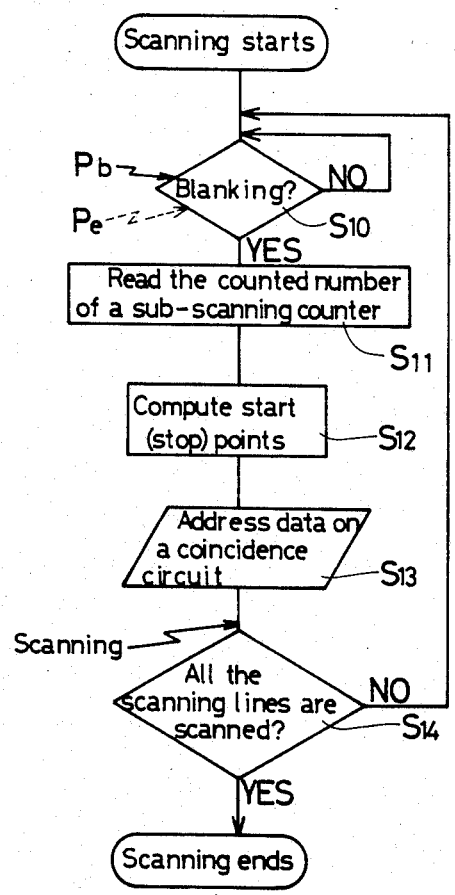
FIG. 4 shows a flow chart indicating the operation of the micro computer when it controls input scanning with transformation work.

According to an input transformation condition, the computer module 10 operates as shown as a flow chart in FIG. 4 to control an input scanning. That is, when a blanking pulse $P_b$ is output from a timing pulse generator 12 or when a stop line is detected, a coincidence signal $P_e$ is output from a stop point coincidence detector 9 (mentioned later) ($S_{10}$), then the output value ($X_i$) of the sub-scanning direction counter 7 is read ($S_{11}$). Next the value ($Y_i$) of the scanning start point is computed according to said value ($X_i$) ($S_{12}$), and the calculated value is set up on a start point coincidence detector 8 ($S_{13}$). The above operation is repeated until the final scanning line, the value(s) set up on the start point coincidence detector 8 (or on the start point coincidence detector 8 and the stop point coincidence detector 9) is(are) renewed every scanning lines ($S_{14}$: No). If the scanning comes to the last scanning stop point, the scanning ends.

Thus the Y value of the scanning start point is set up on a start point coincidence detector 8, which detector 8 outputs a coincidence signal $P_s$ to the set terminal of a set-reset circuit 13 when an output of a main scanning direction counter coincide with the setup value Y. Consequently the set-reset circuit 13 outputs a "H" (high) signal to open an AND-gate 14 which makes an n-time pulse pass through to a writing address counter 15 to make writing addresses for a memory 17. Said address counter 15 is reset to "0" beforehand, therefore a counted number of the n-time pulse itself becomes a writing address. Meanwhile, the output from the AND-gate 14 is input to a writing address generator 16 which supplies a synchronization pulse for writing image data $D_{in}$ with said addresses into memory 17. Thus such writing process precedes, and when the blanking pulse $P_b$ is output from the timing pulse generator 12 to the main scanning counter 6 and to the writing address counter 15, both counters 6 and 15 are reset to stop the writing procedure. In this blanking time, the Y value of the scanning start point of the next scanning line is computed and set up on the coincidence detector 8.

In a case a stop line is set up on the computer module 10, when the Y value being set up on the stop point coincidence circuit 9 coincides with the output value of the main scanning counter 6, the coincidence circuit 9 outputs a coincidence signal $P_e$ to said set-reset circuit 13. Consequently the set-reset circuit outputs a "L" (low) signal to the AND-gate 14 to halt the writing process.

Thus stored image data of every scanning line in the memory 17 is read according to a reading address signal generated in a reading address counter 35 and a pulse from a pulse generator 36 to control a recording head 22 which records a photosensitive film on a recording drum 21.

Figure 5:
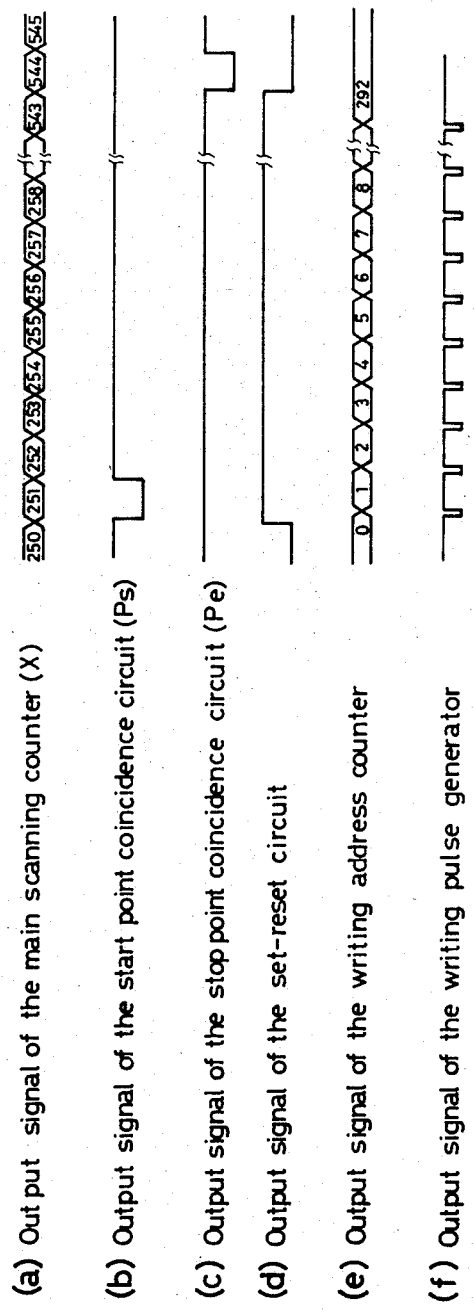
FIG. 5 shows a timing chart of the circuit shown in FIG. 2.

FIG. 5 shows a timing chart of the operation of the circuit shown in FIG. 2 in which the value Y=251 is set up as a scanning start point on the start point coincidence detector 8, and the value Y=544 is set up as a scanning stop point on the stop point coincidence circuit 9.

That is, when the output value of the main scanning counter 6 comes up to the number 251, the detector 8 outputs a coincidence signal $P_s$ to the set-reset circuit 13 which gives out the "H" signal, and when the output value of said counter comes up to the number 544, the detector 9 outputs a coincidence signal $P_e$ to the setreset circuit 13 which gives out the "L" signal. While the writing address counter 15 gives addresses No. 1 to No. 292 to the memory 17 synchronizing with the output of the writing pulse generator 16 as shown in FIG. 5(e).

In Mode (i), the above process is performed. In Mode (ii), the setup value in the coincidence detector 8 is renewed as from 251 to 250, 250 to 249 ... every scanning line according to inclination of a start line. In Mode (iii), when $\gamma=1$, the setup value is renewed as from 251 to 250, 250 to 247 . . . .

Figure 6:
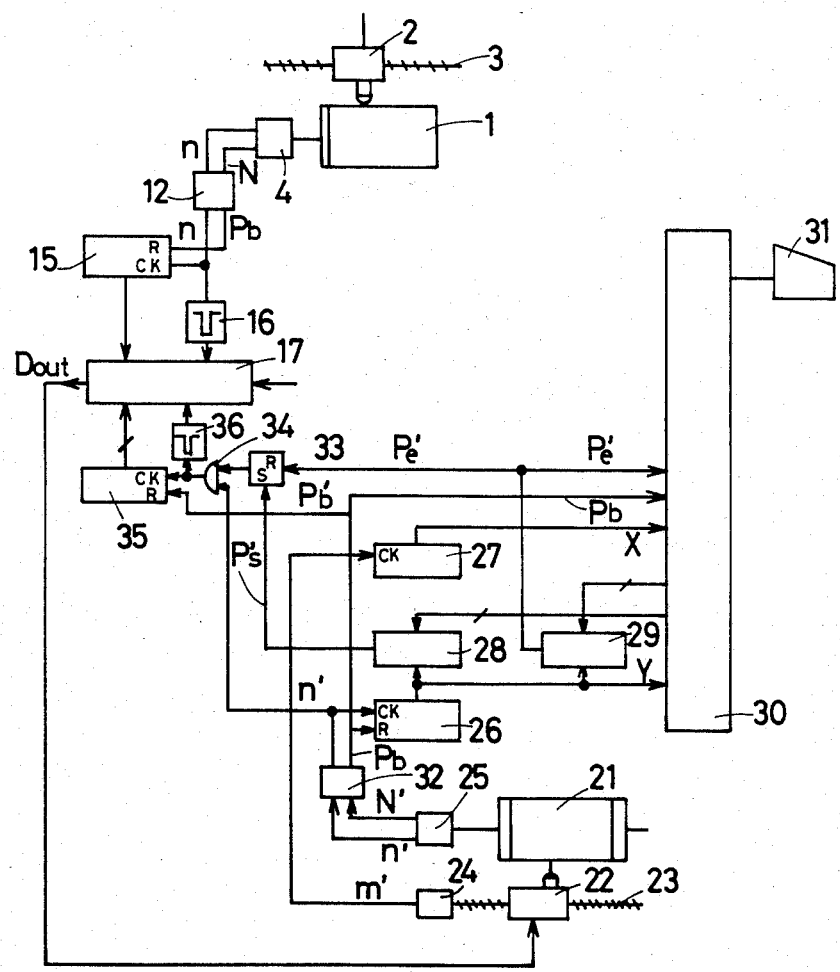
FIG. 6 shows a block diagram of a case in which the method of this invention is applied to output image data.

FIG. 6 shows a block diagram of a circuit in which the method of this invention is applied to a reading process from the memory 17. In this circuit, units which are a sub-scanning encoder 24, a main scanning counter 26, a sub-scanning counter 27, a start point coincidence detector 28, a stop point coincidence detector 29, a computer module 30, a keyboard 31, a timing pulse generator 32, a set-reset circuit 33 and an AND-gate 34 are provided in correspondence with the circuit shown in FIG. 2.

To the memory 17, image data of an original picture are input via the writing address counter 15 without transformation. Then certain image data corresponding to address data from the reading address counter 35 are read from the memory 17 synchronizing with reading pulses given from the reading pulse generator 36. As the operations of the reading address counter 35 and the reading pulse generator 36 are the reversed ones of that of the writing address counter 15 and the writing pulse generator 16 respectively, no detailed explanation for them are mentioned here.

Figure 8:
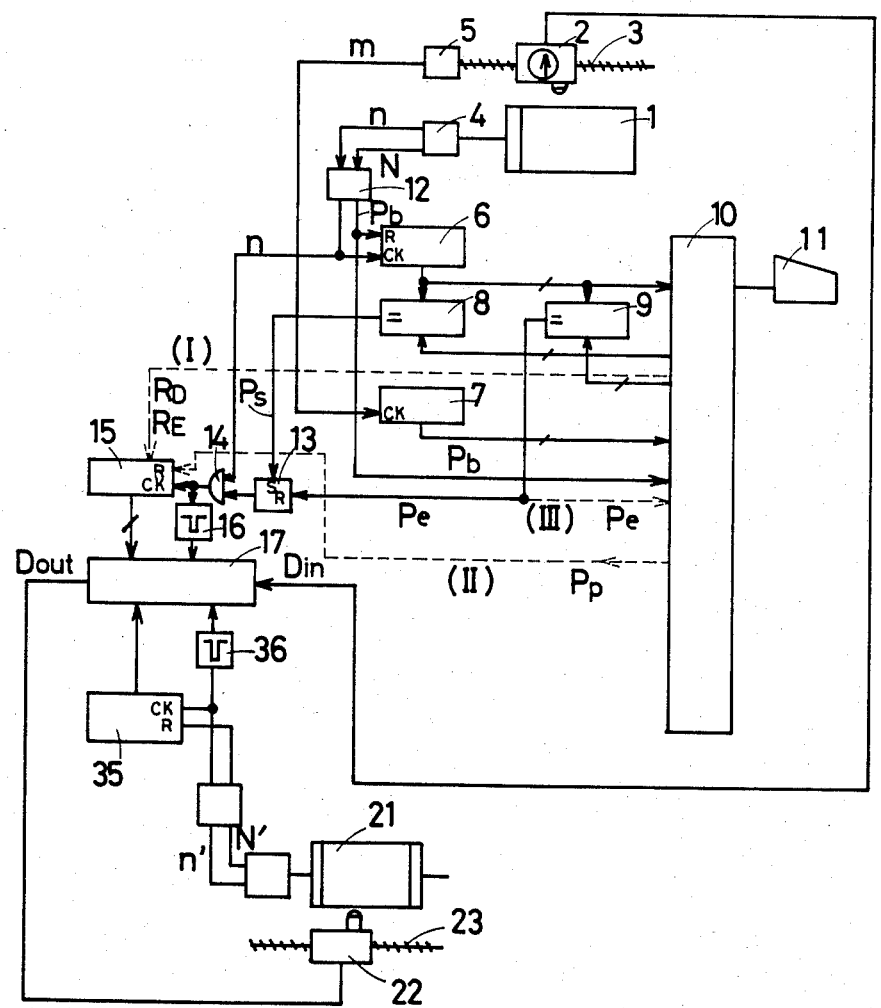
FIG. 8 shows a block diagram of a circuit embodying the method shown in FIG. 7.

Although the aforesaid explanation is based on an embodiment in which sole original picture is transformed, the method of this invention can also be applied to a case wherein multiple original pictures on a drum are transformed. FIG. 7(a) shows an unfolded chart of two original pictures D and E placed on the original picture drum 1 in the main scanning direction, and FIG. 7(b) shows a transformed image of the original pictures D and E. This transformed image can be obtained in the following way by using a system shown in FIG. 8. The system in FIG. 8 corresponds to the system in FIG. 2, in which only broken lines (I), (II) and (III) are supplemented.

In FIG. 7(a), there set up a start line $l_4$ and a stop line $l'_4$ of the original picture D and a start line $l_5$ and a stop line $l'_5$ of the original picture E. While said computer module 10 is loaded with coordinate values $P_{40}$ and $P_{50}$(the first points) and $P_{4n}$ and $P_{5n}$(the end points) of respective start lines $l_4$ and $l_5$, and coordinate values $Q_{40}$ and $Q_{50}$(the first points) of respective stop lines $l'_4$ and $l'_5$. When thus conditioned multiple original pictures are scanned by the scanning head 2, the computer module 10 computes Y values of the points on the start line $l_4$ and the stop line $l'_4$ of a scanning line beforehand by detecting the blanking pulse $P_b$ or the coincidence signal $P_e$ output from the stop point coincidence detector 9 and set up the computed value on the start point coincidence detector 8 and on the stop point coincidence detector 9 respectively. While the computer module 10 gives a Y address value $R_D$ of the writing start point for the memory 17 (in this case, $R_D=0$) of the original picture D, and make the memory take in the value $R_D$ by giving a preset pulse $P_p$ to the reset terminal of the memory 17. When an output value of the main scanning counter 6 comes up to and coincides with the setup value of the start point coincidence detector 8, the image data $D_{in}$ of the original picture D begin to be written into the memory 17 from zero of Y address. When an output value of the main scanning counter 6 comes up to and coincides with the set-up value of the stop point coincidence detector 9, in other words, when the coincidence signal $P_e$ is output after finishing a scanning of the original picture D, the writing process of the image data Din of the original picture is stopped. Meanwhile when the coincidence signal is input to the computer module 10, it judges whether another original picture exists or not. If it exists (in this case it is the original picture E), the computer module 10 computes the scanning start point and the scanning stop point of the scanning line. The computed data are respectively input to the detectors 8 and 9 while the computer module 10 outputs a Y address value $R_E$ of the writing start point for the memory 17 to the address counter 15 at the same time. In the same manner as for the original picture D, image data $D_{in}$ of the original picture E are written into the memory 17 as input scanning procedes, and at last a transformed image as shown in FIG. 7(b) can be obtained.

Incidentally, said computation of the start and stop points of the original pictures D and E can be done at one time beforehand. In this case, at first the Y values of the start and stop points of the original picture D are set up on respective detectors 8 and 9 while such values of both points for the original picture E are temporarily stored in an internal memory of the computer module 10. After finishing the writing of the image data of the original picture D, the values of both start and stop points for the original picture E are set up on respective detectors 8 and 9.

FIG. 9 shows a flow chart of the operation of the computer module for a case wherein plural image are transformed. Like in the case in FIG. 2, at first a counted number of the sub-scanning counter 7 is read in a blanking time ($S_{17}$), and by using the number, the Y value of the start and stop points are computed ($S_{18}$). Then the above computation is repeated until all the Y values of start and stop points for every original picture are computed ($S_{18}$, $S_{19}$, $S_{20}$). The thus obtained values of the start and stop points are memorized into memory units in the reversed order of their addresses ($S_{19}$). In this type of memorizing order, naturally both points of the first original picture are stored last. So only by outputting the memorized data in regular order from the memory units to the coincidence detectors 8 and 9, data of both points in proper order can be obtained.

Unlike the embodiment shown in FIG. 2, in this embodiment, the number M of the original pictures are memorized in a computer module ($S_{16}$). This number M is reduced by one every time data of the next start and stop points are input to the coincidence detector 8 and 9 and are stored in the computer module 10 ($S_{22}$). Every time the stop point coincidence pulse Pe is input to the computer module 10 ($S_{23}$), it examines whether the number M is zero or not ($S_{24}$). When the number M is not zero, the routine from $S_{21}$ to $S_{23}$ is repeated. When the number M is zero, in other words, a scanning line has been scanned, the computer module 10 judges whether all the processes are performed or not ($S_{25}$). If the other scanning lines exist ($S_{25}$: No), the routine from $S_{15}$ to $S_{25}$ are repeated, and if they do not exist ($S_{25}$: YES), all the processes are finished.

Furthermore, unlike the embodiment shown in FIG. 2, said preset value is set up for each original picture and temporary stored in the memory units in each blanking time ($S_{17'}$). In this case, the preset value is the same.

Although the aforesaid process is a case in which plural original pictures are arranged in the main scanning direction, the method of this invention can also be applied to a case in which original pictures are arranged in the sub-scanning direction.

As mentioned above, the method of this invention has a function of computing the scanning start and stop points of every scanning line in advance of actual reading or writing process of image data by setting corresponding start and stop lines of desired transformation conditions on a computer module. This has a merit of performing a stable setting of desired transformation conditions and a correct image reproduction with transformation work.

We claim:

1. A method for recording a transformed image by using an image reproducing system in which image data obtained from an original picture are once written into a memory and then read to be used for driving a recording beam comprising steps of:
   (a) individually computing scanning start point or start and stop points for each scanning line on an original picture in advance of an actual scanning process according to a specified transformation condition being set up on a computer module; and
   (b) writing image data into a memory according to said transformation condition.

2. A method claimed in claim 1 in which said computation process comprises steps of;
   (a) computing the start points or the start and stop points of one scanning line in a blanking time or after the scanning of the previous scanning line is finished;
   (b) setting the computed values of each start point or start and stop points on a coincidence detector; and
   (c) giving a command to stop the input scanning procedure when the scanning of the last scanning line is finished.

3. A method claimed in claim 1 in which the computation process is capable of designating all the scanning start points by inputting the coordinate value of the first scanning start point to the computer module when a reproduced image must not be transformed.

4. A method claimed in claim 1 in which the computation process is capable of designating all the scanning start points by inputting the coordinate values of the first and the end scanning start points to the computer module, when a reproduced image must be transformed according to a straight line which passes on said points.

5. A method claimed in claim 1 in which the computation process is capable of designating all the scanning start points by inputting the coordinate value of the first scanning start point and a function $y=f(x)$ (y is a factor of the reverse direction of the main scanning direction, and x is a factor of the sub-scanning direction) into the memory when a reproduced image must be transformed according to the curved line specialized by said function $Y=f(x)$.

6. A method claimed in claim 1 in which a blanking pulse is used for writing or reading process of the image data into or from the memory.

7. A method claimed in claim 1 in which the computation process is capable of computing the coordinate values of scanning start and stop points of plural original pictures.

8. A method claimed in claim 1 in which the computation process comprises steps of:
   (a) computing the coordinate values of all the start and stop points of plural original pictures in each blanking time;
   (b) setting the computed values of the start and the stop points on respective coincidence detectors for every original pictures;
   (c) commanding the input scanning process get back to the step (a) when the scanning of each scanning line is finished; and
   (d) giving a command to stop the input scanning procedure when the scanning of the last scanning line of the last original picture is finished.

9. A method claimed in claim 1 in which the computation process comprises steps of:
   (a) computing the coordinate values of start and stop points of the next original picture a pulse signal of the stop points of an original picture is detected;
   (b) setting the computed values of the start and stop points on respective coincidence detectors; and
   (c) giving a command to stop the input scanning procedure when the scanning of the last scanning line is finished.

10. A system for recording a transformed image by using an image reproducing system in which image data obtained from an original picture are once written into a memory and then read to be used for driving a recording beam comprising:
    (a) a means for individually computing scanning start points or start and stop points for each scanning line on an original picture in advance of an actual scanning process according to a specified transformation condition being set up on a computer module; and
    (b) a means connected to said means for computing for writing image data into a memory according to said transformation condition.

11. A system claimed in claim 10 in which the means for computing comprises:
    (a) a timing means for causing said means for computing to compute the start point or the start and stop points of one scanning line in a blanking time;
    (b) a means for setting the computed values of each start point or start and stop points on a coincidence detector; and
    (c) a means for giving a command to stop the input scanning procedure when the scanning of the last scanning line is finished.

12. A system claimed in claim 10 in which the means for computing is capable of designating all the scanning start points only by inputting the coordinate value of the first scanning start point ot the computer module when a reproduced image must not be transformed.

13. A system claimed in claim 10 in which the means for computing is capable of designating all the scanning start points by inputting the coordinate values of the first and the end scanning start points to the computer module, when a reproduced image must be transformed according to a straight line which passes on said points.

14. A system claimed in claim 10 in which the means for computing is capable of designating all the scanning start points by inputting the coordinate value of the first scanning start point and a function $y=f(x)$ (y is a factor of the reverse direction of the main scanning direction, and x is a factor of the sub-scanning direction) into the memory when a reproduced image must be transformed according to a curved line specialized by said function $y=f(x)$.

15. A system claimed in claim 10 in which the means for comprising comprises:
    (a) a coincidence detector which detects a coincidence of between the coordinate value of scanning start point (start and stop points) obtained from the computation means and the output value of a main scanning counter; and wherein said writing means comprises
    (b) a circuit for commanding the writing procedure of the image data into the memory according to a coincidence signal obtained by said coincidence detector.

16. A system claimed in claim 15 in which the writing means gives a command to stop the writing process for each scanning line according to the blanking pulse.

17. A system claimed in claim 10 in which the reading means comprises:
   (a) a coincidence detector which detects a coincidence of between the coordinate value of scanning start point (start and stop points) obtained from the computation means and the output value of a main scanning counter; and
   (b) a circuit for designating the reading (reading and reading stop) procedure of the image data from the memory according to a coincidence signal obtained by the above coincidence detector.

18. A system claimed in claim 11 in which the reading means gives a command to stop the reading process for each scanning line according to the blanking pulse.

19. A system claimed in claim 10 in which the computation means computes scanning start and stop points of plural original pictures placed in straight in the main scanning direction.

20. A system claimed in claim 19 and in which the computation means comprises:
   (a) a means for computing the coordinate values of all the start and stop points of plural original pictures in each blanking time;
   (b) a means for setting the computed values of the start and the stop points on respective coincidence detectors for every original pictures;
   (c) a means for commanding the input scanning process get back to the step (a) when the scanning of each scanning line is finished; and
   (d) a means for giving a command to stop the input scanning procedure when the scanning of the last scanning line of the last original picture is finished.

21. A system claimed in claim 19 in which the computation process comprises:
   (a) a means for computing the coordinate values of start and stop points of the next original picture when a pulse signal of the stop points of an original picture is detected;
   (b) a means for setting the computed value of the start and stop points on respective coincidence detectors; and
   (c) a means for giving a command to stop the input scanning procedure when the scanning of the last scanning line is finished.

22. A method of recording a transformed reproduction image by means of an image reproduction system in which image data are obtained by scanning an original picture, written in a memory and read therefrom to drive a recording beam comprising the steps of:
   (a) inputting coordinates of a beginning point of a scanning start line on the original picture to a computation module,
   (b) computing a start point of every scanning line on the original by a computation means within a blanking time interval to obtain image data transformed by a function,
   (c) writing the transformed image data into a memory, and
   (d) reading the image data therefrom to record the image.

23. A method of recording a transformed reproduction image by means of an image reproduction system in which image data are obtained by scanning an original picture, written in a memory and read therefrom to drive a recording beam comprising the steps of:
   (a) inputting coordinates of a beginning point and an ending point of a scanning start line on the original picture to a computer module,
   (b) computing a start point of every scanning line on the original by a computation means within a blanking time interval to obtain image data transformed by a linear function,
   (c) writing the transformed image data into a memory, and
   (d) reading the image data therefrom to record the image.

24. A method of recording a transformed reproduction image by means of an image reproduction system in which image data are obtained by scanning an original picture, written into a memory and read therefrom to drive a recording beam comprising the steps of:
   (a) inputting coordinates of a beginning point of a scanning start line on a photosensitive film to a computer module,
   (b) writing the image data obtained by scanning the original picture into the memory,
   (c) computing a scanning start point of every scanning line on the photosensitive film within a blanking time interval by a computation means to transform the output image by a predetermined function, and
   (d) recording a reproduction image on the basis of image data read out of the memory.

25. A method of recording a transformed reproduction image by means of an image reproduction system in which image data are obtained by scanning an original picture, written into a memory and read therefrom to drive a recording beam comprising the steps of:
   (a) inputting coordinates of a beginning point and an ending point of a scanning start line on a photosensitive film to a computer module,
   (b) writing the image data obtained by scanning the original picture into the memory,
   (c) computing a scanning start point of every scanning line on the photosensitive film within a blanking time interval by a computation means to transform the output image by a linear function, and
   (d) recording a reproduction image on the basis of image data read of the memory.

26. A method for recording a transformed image by using an image reproducing system in which image data obtained from an original picture are once written into a memory and then read to be used for driving a recording beam comprising steps of:
   (a) individually computing scanning start point or start and stop points for each scanning line on an original picture in advance of an actual scanning process according to a specified transformation condition being set up on a computer module; and
   (b) reading image data from a memory according to said transformation condition.

27. a system for recording a transformed image by using an image reproducing system in which image data obtained from an original picture are once written into a memory and then read to be used for driving a recording beam comprising:
   (a) a means for individually computing scanning start points of start and stop points for each scanning line on an original picture in advance of an actual scanning process according to a specified transformation condition being set up on a computer module; and
   (b) reading means connected to said means for computing for reading image data from a memory according to said transformation condition.

* * * * *